United States Patent [19]
Schull

[11] 4,050,063
[45] Sept. 20, 1977

[54] KEY ACTUATED ELECTRONIC LOCK FOR AUTO IGNITIONS

[76] Inventor: George R. Schull, 6778 Eddinghill Drive, Rancho Palos Verdes, Calif. 90274

[21] Appl. No.: 595,545

[22] Filed: July 14, 1975

[51] Int. Cl.² .............................................. H04Q 3/00
[52] U.S. Cl. ......................... 340/274 C; 340/149 A; 340/147 MD; 70/278
[58] Field of Search ........... 340/149 A, 149 R, 164 R, 340/147 MD, 274 C; 70/278; 317/134

[56] References Cited
U.S. PATENT DOCUMENTS

| | | | |
|---|---|---|---|
| 3,165,599 | 1/1965 | Clay .................................. | 340/274 C |
| 3,415,087 | 12/1968 | Krasmasz ......................... | 340/274 C |
| 3,500,326 | 3/1970 | Benford ............................ | 340/274 C |
| 3,587,051 | 6/1971 | Hovey .............................. | 340/274 C |

*Primary Examiner*—Harold I. Pitts

[57] ABSTRACT

A key-actuated electronic lock system for auto ignitions including a conventional auto ignition key-lock combination. Electronic lock actuating information is stored on the key and the lock supports a transducer for sensing the information stored on the key as it is inserted into the lock and for generating a coded electric signal indicative of the lock actuating information for application to a control secured in a locked compartment remote from the ignition lock. Within the control, the coded signal is compared with programmable coded information stored in the control and indicative of the electronic lock actuating information. A match of the information actuates circuitry for applying electric power to the auto ignition and auto accessories as desired including a lock to the locked compartment. The control includes a time delay lock out preventing unauthorized pulse code generator input from operating the system and over voltage protection devices for preventing a voltage override of the system. An auxiliary circuit allows operation of the auto ignition only by a standard mechanically coded ignition key after a combined closing of an auxiliary permit switch and actuation of the auto ignition lock with the electronically coded key.

8 Claims, 6 Drawing Figures

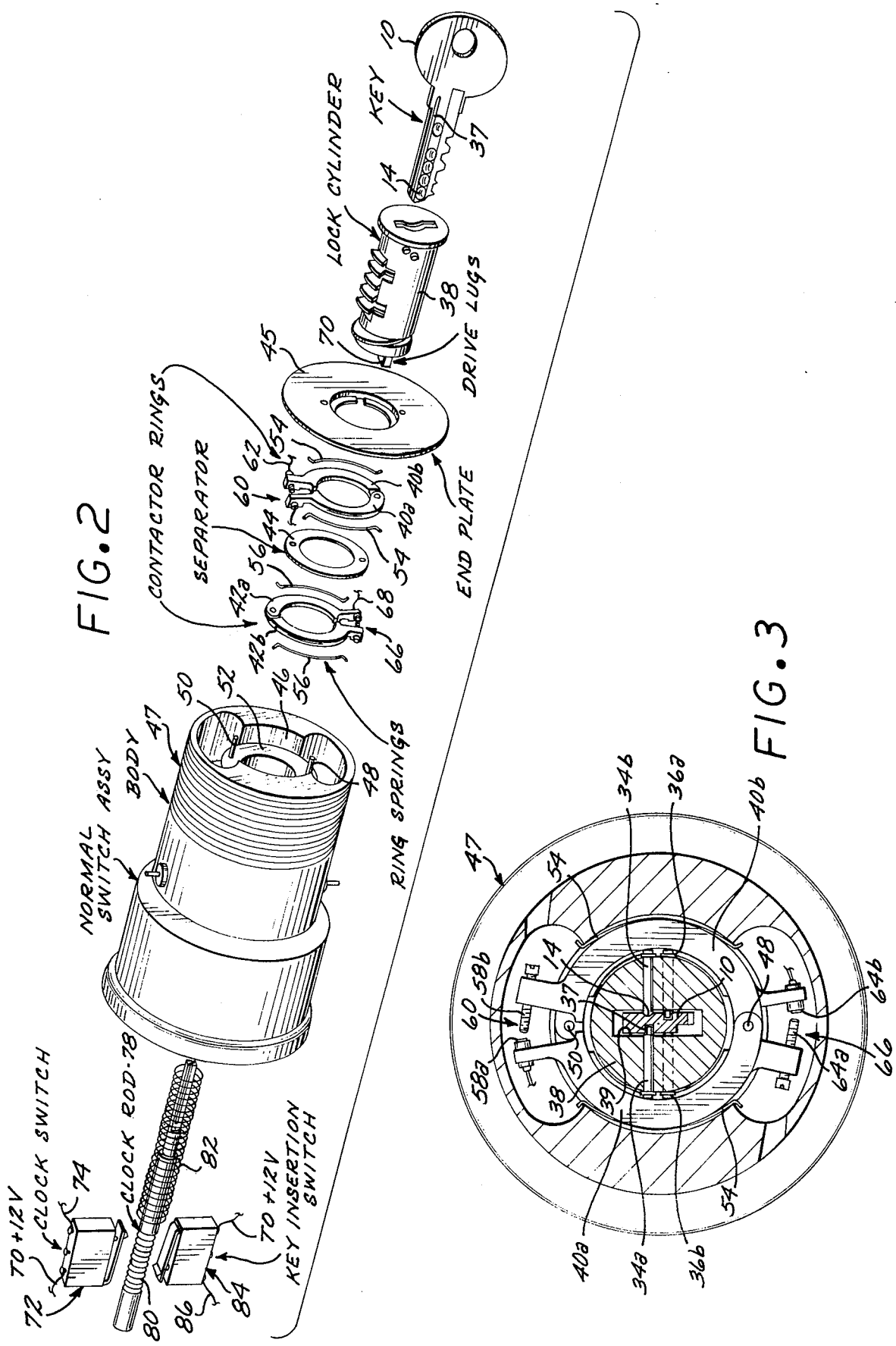

KEY ACTUATED ELECTRONIC LOCK FOR AUTO IGNITIONS

BACKGROUND AND BRIEF SUMMARY OF INVENTION

The present invention relates to auto theft prevention systems and more particularly to an electronic lock system for an auto ignition which prevents "hot wiring" and other unauthorized over riding of an auto ignition.

Contemporary ignition locks provide virtually no detriment to theft, since the lock can be jumpered or, alternatively, the ignition and starter circuits can be controlled directly from within the engine compartment. To preclude this, the engine compartment must be made secure and unauthorized access to the lock code denied.

To accomplish this according to the present invention, the engine compartment may be secured by an electromechanical disconnect in the hood latching mechanism, such that when unenergized the latch-release handle disconnects from the latching mechanism. Such a device may not have much mechanical strength nor require but little electrical power to operate. Further, the lock code is secured as by locating it in the secured engine compartment. The key code may then be transduced, in the open, to an electrical format, and transmitted to the secured compartment for comparison with the lock code. A match of the codes may then permit both normal engine operation and access to the secured compartment.

It is a practical necessity that the legimate user not be penalized by the security system. In the present invention this is simply accomplished by adding an electronic code to the standard ignition key and by modifying the standard ignition lock to also serve as a code transducer. No additional action or time delay is imposed on the legitimate user.

Unfortunately, since such an electronic lock system is inherently capable of very high speed operation, it is vulnerable to unauthorized operation in response to high-speed electronic code generators unless appropriate countermeasures are taken. In the present invention, the system includes time delay means to prevent operation by a code generator. For example, in one form of the invention a first coded word from a code generator may be accepted without penalty. If it is the correct code, there is no further input needed or given while the system is energized. However, if it is incorrect, a subsequent code sequence will preclude acceptance of all further data while the ignition system is energized. To escape from such a lock out mode, the system must be de-energized and then re-energized. After a time delay, such as one second, from de-energization, the system will again accept one code sequence. Thus, an electronic code generator can not effectively generate trial sequences faster than one per second. In addition to the time delay, there must be a sufficient number of possible codes to make the trial of all possible sequences adequately long. For a 16-bit lock code, for example, at one sequence per second, requires 18 hours for all sequences.

In addition, the electronic lock must be protected from brute-force entry. For example, over-voltage or reverse polarity may cause circuitry to fail in a manner permitting access. In the present invention, such entry is precluded by shunting Zener diodes across each access line, such that there is zener conduction if the applied voltage is much above normal and forward diode conduction if reverse polarity is applied. Further, each such line is fused so that either event will open the circuit.

The foregoing and other features of the present invention may be more clearly understood by reference to the following detailed description, when considered with the drawings which by way of example illustrate one form of electronic lock system embodying the features of the present invention.

BRIEF DESCRIPTION OF DRAWINGS

FIG. 2 is an exploded perspective view of the ignition key-lock combination including electronic lock actuation information (key code) on the key and a transducer on the lock to generate an electrical signal indicative of the key code as the key is inserted into the lock.

FIG. 3 is a cross-sectional front view of the lock of FIG. 2 showing the lock cylinder with the key in place and the transducer sensing the electronic lock actuation information on the key to generate the electrical signal indicative thereof.

DETAILED DESCRIPTION OF INVENTION

Figure 1:
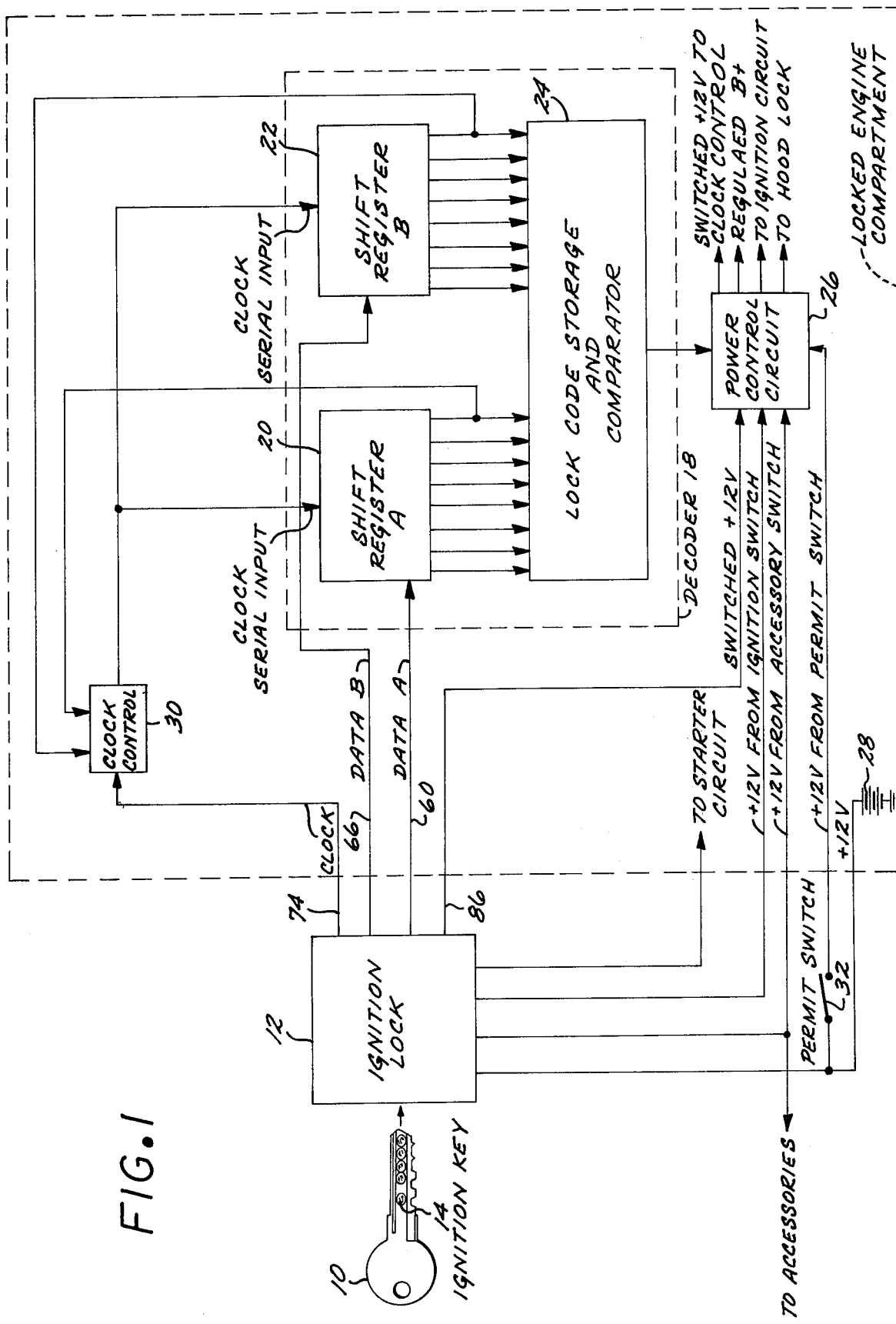
FIG. 1 is a block diagram of a key-actuated electronic lock system including the features of the present invention.

As represented in FIG. 1, the key actuated electronic lock system basically comprises a conventional auto ignition key 10 and lock 12 modified to provide auto engine operation and/or access to an electromechanically locked engine compartment housing the balance of the system, only in response to a match between electronic lock actuating information stored on the key (key code) and lock actuating information stored in the secured compartment (lock code).

More particularly, the key code may comprise one or more series of longitudinally spaced dimples or depressions, such as 14, on one or both sides of the key 10 for defining a binary coded word indicative of the lock actuating information; a dimple representing a logic 1 and the absence of a dimple representing a logic 0. The lock 12 is modified by the addition of a transducer 16 (see FIGS. 2 and 3) for sensing the key code a the key is inserted into the lock and for generating an electrical signal such as a series of electrical pulses for each series of dimples defining a binary coded word indicative of the key code stored on the key. The coded signal generated by the transducer 16 and indicative of the key code is applied to a decoder 18 in the locked engine compartment. There, the coded signal is clocked into a pair of shift registers 20 and 22 and compared with binary coded information stored in a comparator 24 and indicative of the electronic lock actuating information or lock code. A match of the key code to the lock code develops a signal at the input to a power control circuit 26 which enables electric power to be transmitted from a source 28 to the auto ignition and/or accessories including a hood latch mechanism for the locked engine compartment to provide access thereto, as desired.

To preclude operation of the system in response to externally generated coded signals applied to the decoder 18 as by a high speed electronic code generator, the system includes a clock control circuit 30 responsive to the last stage in each of the shift registers 20 and 22 to block the passage of clock pulses to the shift registers when the last stages assume a predetermined logic condition indicative of a key code which does not match the lock code and indicative of an unauthorized attempt to override the system. As will be described in greater detail hereinafter, the lock out of the clock pulses is maintained for at least a minimum period of time to render ineffective the use of a code generator to override the system.

In addition, to permit the owner of the auto incorporating the system to allow others such as auto park attendants to drive and move the auto without having access to the locked engine compartment or accessories, the system includes a permit switch 32 connected to the source 28 and to the power control circuit 26 such that an operator using a standard key for the ignition lock 12 without the electronic key code thereon may start the auto by actuating the lock with the permit switch 32 closed. However, once the permit switch is opened, as operator can thereafter only start the auto by use of the modified key bearing the electronic key code matching the lock code.

Lock-Transducer

As previously indicated, the locl-transducer comprises a conventional cylinder-type lock modified to translate a sequence of dimples or depressions 14 added to a standard key 10, into a series of electrical pulses defining a binary coded word or key code. In the illustrated form of the invention, two 8-bit sequences of dimples are embossed on opposite sides of the key 10 so that the transducer 16 is designed to generate two data streams, labeled A and B, which when combined in the decoder 18 define the binary coded word corresponding to the key code stored on the key 10.

To provide such a reading of the two sequences of dimples, the transducer 16 comprises two pair of diametrically opposed pins 34a, b and 36a, b; each pair being slidable in transverse and coaxial holes through the cylinder 38 of the lock 12. The coaxial holes for the pin pairs 34 and 36 are longitudinally spaced along the cylinder 38 and each pin includes as enlarged head for limiting axial movement into the key slot 39 in the lock cylinder. Of each pin pair, the pins 34a and 36a are transfer pins aligned such that inner ends thereof engage opposite sides of the key 10 and ride into and out of the two sequences of dimples 14 as the key is moved into the key slot 39. Of each pin pair, the pins 34b and 36b are key pins aligned such that inner ends thereof ride in keyways of slots 37 in the sides of the key 10 opposite the sequences of dimples 14.

In the illustrated form of the transducer 16, axial movement of the transfer pins 34a and 36a into and out of a dimple 14 is translated into an electrical pulse indicative of a bit in a coded work defining the electronic key code for the key 10. To accomplish this, the pairs of pins are spring loaded and actuate switches connected to a source of electric power. In particular, the transducer 16 further includes two pairs of split ring members 40a, b and 42a, b; one for each pin pair 34 and 36. The split ring members 40a, b and 42a, b are each pivotally connected at one end to circumscribe the lock cylinder 38 in line with the outer ends of the transfer and key pins of the associated pin pairs. In this regard, the split ring members 40 are aligned with and bear inwardly on the outer ends of the transfer and key pins 34a and 34b while the split ring members 42 are longitudinally spaced from the members 40 by an annular separator 44 and are aligned with and bear inwardly on the outer ends of the transfer and key pins 36a and 36b. Thus arranged, the split ring members and separator are secured by an end plate 45 within an enlarged open front end 46 of a support body 47 for the lock cylinder 38; the pivots for the ring members 40 and 42 comprising longitudinally extending and diametrically opposed pivot pins 48 and 50 respectively, secured to an annular shoulder 52 within the body 47. Thus, the split ring members 40 pivot on the pin 48 and are inverted relative to the ring members 42 which pivot on the pin 50. Further, the open ends of the ring members 40 and 42 are diametrically opposite each other and are free to open and close in response to axial movement of the associated transfer pins under the continuous urging of spring members 54 and 56 respectively. In particular, the spring members 54 and 56 may comprise pairs of leaf springs on the outer surfaces of the ring members 40 and 42 respectively, with ends bearing against the inner annular surface of the enlarged open end 46 of the body 47 as illustrated in FIG. 3. Under such control, the opening and closing of the free ends of the ring members in response to axial movement of associated transfer pins into and out of the coded dimples 14 open and close switches connected to an electric power source to generate electrical pulses. For example the free ends of the ring members 40a, b may carry electrical contacts 58a, b defining a switch 60 connected to the source 28 and to a line 62 for transmitting data A to the decoder 18 while the free ends of the ring members 42a, b may carry electrical contacts 64a, b defining a switch 66 connected to the source 28 and to a line 68 for transmitting data B to the decoder 18.

As illustrated in FIG. 3, the contacts comprising the switches 60 and 66 are normally spaced from each other and the switches are open. It is important that the switches only close in response to axial movement of a transfer pin into a dimple 14 and not in response to lateral movement of the key 10 in the key slot 39. The key pins provide such control by maintaining the separation of the free ends of the split rings in response to any lateral movement of the key in the key slot.

Further, it is important to note that the normal ignition lock switching functions of the lock 12 are not disturbed by the addition of the transducer 16. A standard mechanically coded key will still turn the lock cylinder to transmit electric power to the accessories in the auto, such as the radio, heater and air conditioner, for independent switch control with the auto engine off. Such accessory control is by a standard switch assembly housed within the body 47 which operates in response to a turning of drive lugs 70 on the end of the lock cylinder 38. However, the addition of the transducer 16 does prevent a starting of the auto engine without use of the electronically coded key 10, unless the auxilary circuit including the permit switch 32 is actuated, as will be described in detail hereinafter.

In addition to generating the electrical pulse data A and B corresponding to the binary coded word indicative of the electronic key word on the key 10, the transducer 16 provides means for clocking such data into the decoder for comparison with a lock code stored therein. In particular, to generate a series of clock pulses in synchronism with the data A and B, the transducer 16 includes a stationary clock switch 72 connected to an electric power source such as 28 and to the decoder via a line 74 and including a actuating switch arm 76. In addition, the transducer includes a spring-loaded clock rod 78 carrying a series of evenly spaced depressions 80. The rod is adapted to ride adjacent the switch 72 in response to movement of the key 10 into the key slot 39 to cause the switch arm 76 to ride over the depressions 80 and produce a series of closings and openings of the switch to apply a series of clock pulses to the line 74. Preferably, the clock rod is a round shaft with a slotted flat on one end fitting the key slot 39 to ride therein. The depressions 80 comprise eight regularly spaced circular grooves on an opposite end of the rod. Further, the rod is spring loaded forward in the key slot 39 by a coil spring 82 around the rod adjacent the grooves and adapted for compression against a back member of the lock body 47 as the rod is moved rearwardly in response to movement of the key 10 into the key slot 39. In particular, when the key is inserted in the key slot, its tip contacts the clock rod 78 moving it axially with the key to produce a uniformly spaced set of 8-clock pulses as the grooves move under the switch arm 76.

In addition, within the transducer 16 there is a key insertion switch 84 in series with power source 28 for sensing motion of the clock rod 78 and for transmitting electric power (+12 v) to the power control circuit 26 via a line 86 to energize the electronic lock system as soon as the key in introduced to the key slot.

Decoder

As previously indicated, the decoder 18 is adapted to receive the data A and B and clockpulses generated in the transducer 16 and representing the electronic key code on the key 10 and to compare the key code with a preselected and programable lock code stored in the decoder. If, and only if, the key code matches the lock code is the output of the decoder energized to enable the power control circuit 26.

More particularly, as illustrated in FIG. 1, the decoder 18 comprises the shift registers 20 and 22 for processing the A and B data respectively, and a storage and comparator 24 for storing the lock code and comparing it with the key code to develop the power control circuit enabling signal only upon a match of the codes.

Figure 4:
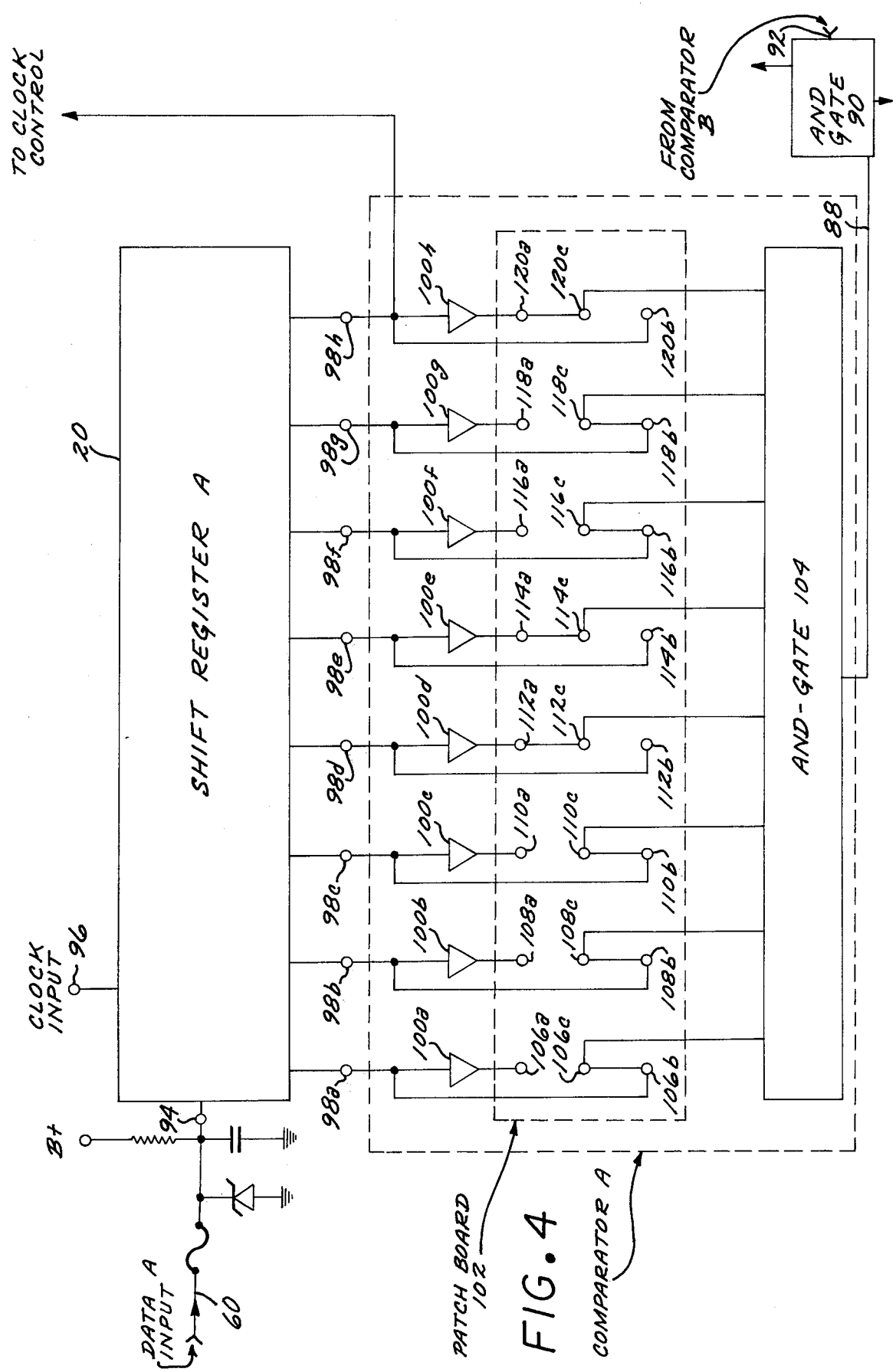
FIG. 4 is a schematic-block diagram of the A portion of the decoder illustrated in FIG. 1, the B portion being identical thereto.

FIG. 4 depicts the A-portion of the decoder including the shift register 20 and the portion of the comparator 24 for processing the A data and comparing it with an A-portion of the lock code to generate a signal at an input 88 to an AND-gate 90 upon a match of the A data and A-portion of the lock code. The B-portion of the decoder 18 (not specifically shown) is identical to the A-portion and is adapted to similarly process the B data and upon a match of the B data with the B-portion of the lock code, apply a signal to an input 92 to the AND-gate 90—such signals applied to both inputs to the AND-gate producing the enabling signal for the power control circuit 26.

Preferably, the shift register 20 is a conventional eight-stage register including a data input 94, a clock input 96 and eight output terminals 98a–98h, one for each stage. The input 94 is connected to the data A line 60 from the transducer 16, the input 96 to the clock line 74 and the output terminals to the A-portion of the comparator 24. The pulses comprising the data A are fed serially into input 94 and clocked or stepped by the clock pulses from the first to the eight stages in a conventional manner. Thus, for example, if the A-portion of the key code represented by the data A is 01100111, the output terminals of the eighth through first stages of the shift register 20 assume such output conditions, e.g. a relative high reference voltage for logic 1 and a relative low reference voltage for a logic 0.

The comparator 24 preferably comprises a plurality of inverters 100a–100h, one for each register output terminal 98a–98h, a patchboard 102 and an AND-gate 104. The patchboard 102 may comprise a conventional printed circuit board and includes eight pairs of input terminals 106a, b–120a, b and eight output terminals 106c–120c, each input terminal pair and output terminal being associated with a different shift register output terminal. For example, register output terminal 98a is connected to input terminal 106b and to input 106a via the inverter 100a, the register output terminal 98b is connected to the input terminal 108b and to the input terminal 108a via the inverter 100b and so on. The patchboard 102 has adapted selective and programable internal connections between its input and output terminals to store the A-portion of the lock code. For example, if the A-portion of the lock code is 01100111 the input terminals 106b, 108b, 110b, 112a, 114a, 116b, 118b and 120a are electrically connected, as by appropriate etching of the printed circuit board, to their associated output terminals 106c–120c as shown in FIG. 4—each output terminal being connected to a different input to a conventional AND-gate 104 having its output connected to the input 88 to the AND-gate 90. The AND-gate 104 is designed to produce or pass an output signal only when all inputs are a logic 1 or a relative high reference voltage. If the relative high reference voltage is only generated at the output of a stage of the shift register 20 in response to a logic 1 or at the output of an inverter 100 only in response to a logic 0, then under the assumed A-portion of the lock code 01100111, the AND-gate 104 will only pass as enabling signal to the AND-gate 90 if the A-portion of the key code stored in the shift register 20 is also 01100111. In particular, for the assumed A-portion of the key code 01100111, the shift register output terminals 98a, b, c, f and g will be at the relative high reference voltage, while by operation of the inverters 100d, e and h the patchboard input terminals 112a, 114a and 120a will be at the relative high reference voltage. Under such conditions, only the previously assumed internal electrical connections in the patchboard and indicative of an A-portion for the lock code 01100111 will produce a relative high reference voltage at each input to the AND-gate 104 indicative of a match between the A-portions of the key and lock codes. If the key code in any digit is other than as indicated, a match does not result. For example, if the first digit of the A-portion of the key code is a logic 1 rather than a logic 0, the last stage of the register 20 produces the relative high reference voltage at the output terminal 98h for application to the input terminal 120b of the patchboard rather than at the output to the inverter 100h and the relative high reference voltage is not passed to the input terminal of the AND-gate connected to the output terminal 120c thereby blocking operation of the AND-gate. In this manner, the inverters 100 and the patchboard combine with the AND-gate 104 to provide the means for storing the A-portion of the lock code and for comparing it with the A-portion of the key code from the shift register 20 to provide an enabling input to the AND-gate 104 for combination with a similar input from the B-portion of the comparator 24 only in response to a similar match of the B-portions of the key and lock codes -a combination of such inputs at the AND-gate 90 producing the enabling signal for the power control circuit 26.

Power Control Circuit

Basically, the power control circuit 26 includes a voltage regulator 122 and gate or switch circuits 124 and 126 for the auto ignition circuit and the hood lock securing the engine compartment. In addition, a permit switch controlled circuit 128 is included for enabling the ignition circuit 126.

Figure 5:
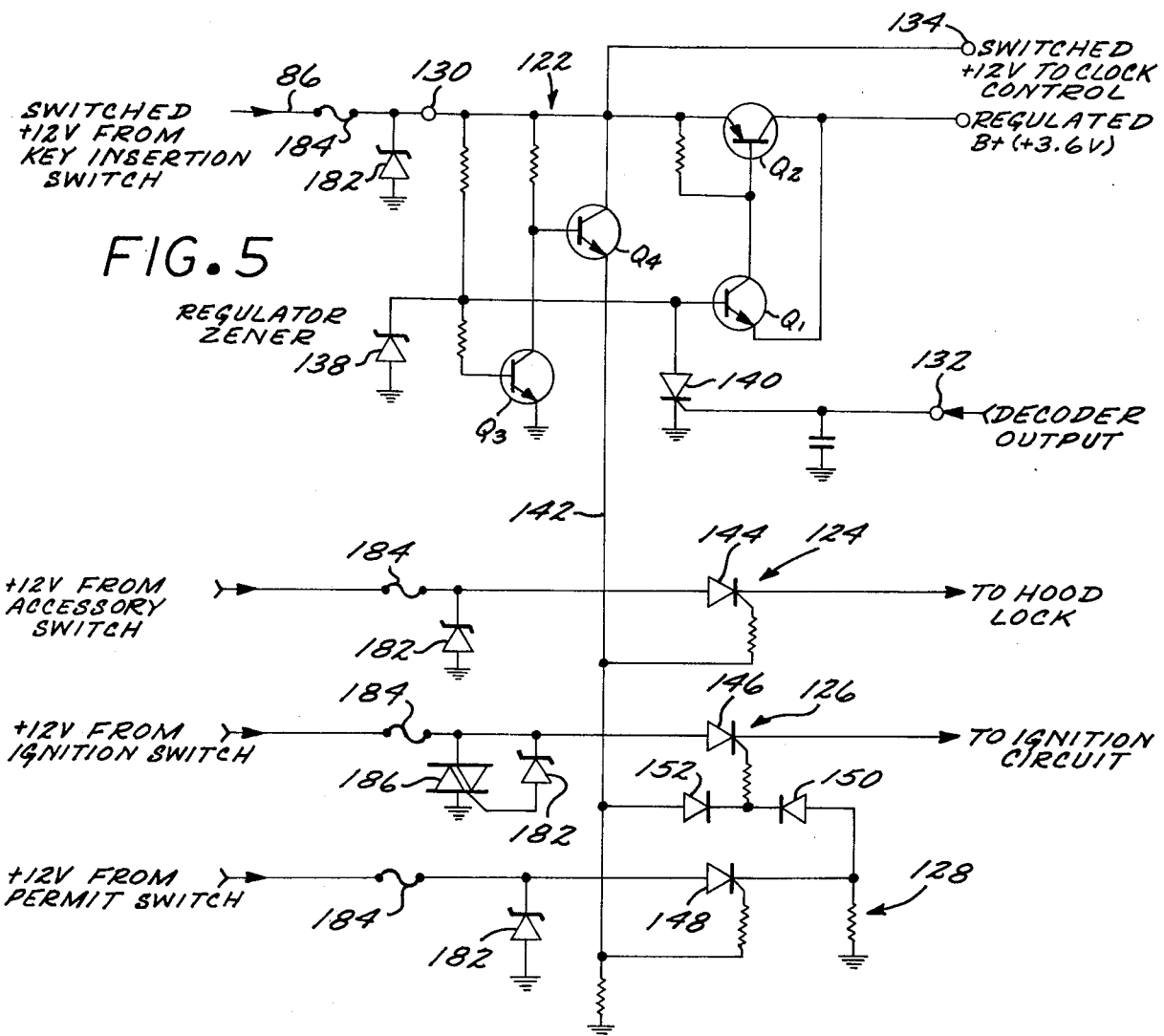
FIG. 5 is a schematic diagram of the power control circuit of FIG. 1.

As illustrated in FIG. 5, the power control circuit is adapted to provide a regulated B+ (+3.6 v) from the primary or +12 v battery line and upon receipt of an enabling or "true" signal from the decoder 18, to remember the "true" status and turn off the regulator. Further, the illustrated power control circuit is adapted to enable power to be applied to the ignition circuit and hood lock circuit when in a "true" state and in response to a mechanical turning of the lock cylinder actuate the ignition and accessory switches of the lock respectively. Moreover, if the status of the power control circuit is "true" and the permit switch 32 is closed, the power control circuit permits operation of the ignition circuit but not the hood lock circuit by a mechanically-only coded key.

Figure 6:
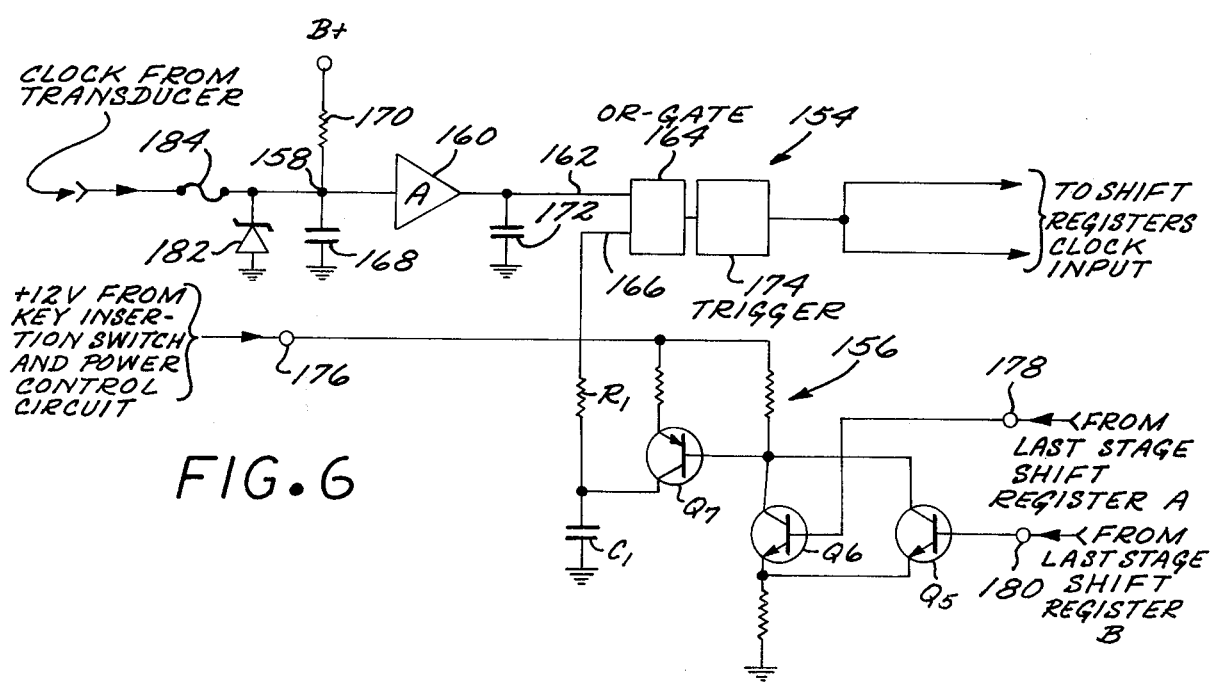
FIG. 6 is a schematic diagram of the clock control circuit of FIG. 1.

More particularly, the regulator 122 comprises conventional solid-state circuitry and includes an input terminal 130 connected to the line 86 applying switched +12 v from the key insertion switch 84 in the transducer 16 and an input terminal 132 for receiving the enabling signal or logic output from the AND-gate 90 in the decoder 18. In addition, output terminals 134 and 136 from the regulator 122 apply the switched +12 v to the clock control circuit 3 and the regulated B+ (+3.6 v) to the inputs to the shift registers 20 and 22 and to the clock control circuit 30 as illustrated in FIG. 6. The regulator 122 further includes four transistors $Q_1$, $Q_2$, $Q_3$ and $Q_4$, a regulator Zener diode 138, a silicon-controlled rectifier (SCR) 140 and associated and conventional biasing resistors for the Zener 138 and transistors.

In operation, and prior to the receipt of a "true" signal at the input 132, the regulated voltage B+ (+3.6 v) developed at the output terminal 136 is compared with the voltage across the Zener 138 by the transistor $Q_1$ which controls operation of the pass transistor $Q_2$. Also, the transistor $Q_3$ is biased fully on, reducing the voltage at the base of the emitter-follower $Q_4$ and the voltage on a control buss 142 to a predetermined low potential. Under such conditions, the ignition and hood lock circuits 124 and 126 are disabled and a mechanical actuation of the associated ignition and accessory switches by a mechanically-coded key in the ignition lock cylinder will not energize the auto ignition or open the hood lock.

When a "true" or enabling signal is applied to the input terminal 132 in response to a match of the key and lock codes in the decoder 18, the SCR 140 fires immediately reducing the regulator zener voltage. As this occurs, the regulated output voltage B+ falls to a fraction of a volt. With the reduction in the regulator zener voltage, the transistor $Q_3$ turns off, causing the transistor $Q_4$ to become fully conductive. Under such conditions, the control buss 142 is nearly at the primary line potential. Thus, in the "true" status, and then only, the regulator 122 supplies a gating current on the control buss 142 sufficient to actuate the hood lock and ignition circuits 124 and 126.

In this regard, the hood lock and ignition circuits 124 and 126 include SCRs 144 and 146 respectively, each having a gate resistively connected to the control buss 142. The anode of the SCR 144 is connected to receive +12 v from the ignition lock accessory switch while the cathode of the SCR is connected to apply power to the hood lock upon actuation of the SCR and a closing of the accessory switch. The anode of the SCR 146 is connected to receive +12 v from the ignition lock ignition switch while the cathode of the SCR is connected to apply power to the auto ignition upon actuation of the SCR and a closing of the ignition switch. Thus, with the regulator 122 in the "true" state to supply gating current to the control buss 142 and hence to the gates of the SCR's 144 and 146, a closing of the ignition switch will apply virtually full primary voltage to the auto ignition while a closing of the accessory switch will apply such power to the hood lock.

Like the hood lock and ignition circuits 124 and 126, the permit switch controlled circuit 128 includes an SCR 148 having its gate resistively connected to the control buss 142. The anode of the SCR 148 is connected to receive +12 from the permit switch 32 while the cathode is resistively connected to a reference ground common to the buss 142 and to the anode of a diode 150. The cathode of the diode 150 is connected to the gate resistor for the SCR 146 and to the cathode of a diode 152 having its anode connected to the control buss to supply gating current to the gate of the SCR 146. Thus arranged, when the regulator 122 is in the "true" state the SCR 148 is enabled by the gating current supplied to its gate and upon a closing of the permit switch 32 applies a gating current to the SCR 146 in the ignition circuit 126. Such gating current is held at the gate of the SCR 146 independent of the subsequent status of the regulator 122 and until the permit switch 32 is again opened. Accordingly, once the permit switch circuit 128 has been enabled by the "true" status of the regulator 122 and the SCR 148 actuated by a closing of the permit switch 32, only operation of the ignition switch is required to actuate the SCR 146 and energize the ignition circuit 126. In this mode, the ignition may be turned on and off repeatively with only a mechanically coded ignition key. However, access to the hood lock circuit 124 is denied without the regulator 122 assuming a "true" status, and any interruption of the "permit" status denies further access to the ignition circuit until a "true" status again occurs, i.e. until a properly electronically coded key is inserted into the ignition lock cylinder.

As previously mentioned, the forgoing features of the permit circuit are particularly desireable where the auto owner desires to park his car in a lot and provide only the lot attendant with the ability to move the car without having access to the locked engine compartment. To accomplish this, the owner, with the electronically coded key in the ignition lock cylinder and the regulator in the "true" state, closes the permit switch 32. He then removes the electronically coded key and provides the lot attendant with a mechanically coded ignition key, that is a key that will mechanically turn the lock cylinder but which does not include the electronic key code information. So long as the permit switch remains closed, the attendant alone may move the car. Others, without the electronically coded or mechanically coded keys can not and are denied access to the locked engine compartment for the purposes of "hot wiring" or otherwise bypassing the ignition in an attempt to start the car in an unauthorized manner.

As previously indicated other means of overriding the electronic lock system such as by use of high speed pulse code generators, are rendered ineffective in the present invention. The clock control circuit 30 provides protection against override by a code generator.

Clock Control Circuit

Basically, the clock control circuit 30 includes a clock pulse shaping section 154 and a control section 156. The pulse shaping section 154 conditions the clock pulses form the transducer 16 to produce pulses having rapid, bounce-free fall and the control section 156 locks out or prohibits clocking after a first code sequence has been clocked into the shift registers 20 and 22 of the decoder 18.

More particularly, and as shown in FIG. 6, the pulse shaping section of the clock control circuit 130 includes an input terminal 158 for receiving clock pulses from the transducer 16. A conventional buffer amplifier 160 is connected in series with the input 158 and to an input 162 of an OR-gate 164, a second input 166 being connected to the control section 156. Also connected to the input 158 is a grounded capacitor 168 and a resistor 170 connected to the regulated voltage B+ (+3.6 v). A capacitor 172 is connected to the output of the amplifier 160 while a conventional pulse trigger circuit 174 is connected to the output of the OR-gate to supply shaped clock pulses simultaneously to the clock inputs to the shift registers 20 and 22 in the decoder.

In operation, a closure of the clock switch 72 may generate either a relatively high or low voltage. For purposes of the following description, it will be assumed that a contact closure produces a low voltage. As this occurs, the charged storage capacitor 168 immediately discharges. Under such conditions, if the contacts should bounce open with movement of the key 10 in the lock cylinder, the capacitor voltage rises slowly by virtue of the time constant of the storage capacitor 168 and the resistor 170. Befor the capacitor voltage has risen substantially, the contact will bounce closed again rapidly discharging the capacitor. Thus the effects of any clock switch contact bounce are minimized by the storage capacitor 168. The storage capacitor 172 connected to the output of the buffer amplifier 160 similarly reduces the rate of fall of such residual transcients caused by contact bounce to insure that the trigger circuit 174 is actuated in a conventional manner only by the level of the input clock pulse and not by its rate of fall. In particular, the trigger circuit 174 produces uniform, fast fall clock pulses for clocking the data A and B into the shift registers 20 and 22 of the decoder 18.

As illustrated in FIG. 6, the control section 156 of the clock control circuit includes three input terminals 176, 178 and 180. The input terminal 176 is connected to receive the +12 v from the key insertion switch 84 in the transducer 16 via the power control circuit 26 as illustrated in FIG. 5, while the input terminals 178 and 180 are connected to the last stages of the shift registers 20 and 22 as illustrated in FIG. 4 for the register 20. In addition, the control section 156 includes two input transistors $Q_5$ and $Q_6$ whose parallel outputs drive a transistor $Q_7$. As shown, the bases of the transistors $Q_5$ and $Q_6$ are connected to the last stages of the shift registers 22 and 20 respectively while the emitters are resistively connected in common to ground potential and the collectors are connected in commmon to the base of the transistor $Q_7$ and to the input terminal 176. The emitter of the transistor $Q_7$ also is connected resistively to the input terminal 176 while the collector is connected to a junction of the resistor $R_1$ and the capacitor $C_1$.

In operation, it is required that when the shift registers in the decoder 18 are initially energized, all stages automatically assume a low state indicative of a logic 1. Thus, the last stage of the registers 20 and 22 will not assume a high state indicative of a logic 0 until at least eight bits have been clocked therein. In response to a logic 0 in the first bit in an eight bit coded word, or in response to a logic 0 in a bit of a subsequent word, the last stage of at least one of the registers will assume a high state. Such a relatively high voltage will be applied to either the input 178 or 180 to turn on either transistor $Q_6$ or $Q_5$ which, in turn, turns on the transistor $Q_7$ thereby charging capacitor $C_1$ from the primary line (+12). Current is then applied to the input 166 of the OR-gate 164 causing its output to assume a "high" output condition. Thereafter, whether the clock signal to the input 162 to OR-gate 164 is high or low, the output remains high and no further clocking is provided by the trigger circuit 174 to the shift registers 20 and 22. This produces a blocking of any further data in the decoder. In particular, since there is no further generation of clock pulses, the register output stage that initiated such action by assuming a high condition remains high, and the lock out continues as long as the system is energized. If power is removed and reapplied to the decoder, however, all register stages will reset to a low state and clocking may be resumed after the charge on capacitor $C_1$ has drained off to produce a current below the threshold for the OR-gate 164 (approximately 1 second).

From the forgoing, it should be appreciated that the control section 156 of the clock control circuit 30 effectively prevents the use of a code generator in overriding the system of the present invention. For, just as soon as a logic 0 is clocked into the last stage of either shift register by such a code generator, the clock pulses are inhibited. Before processing of codes can resume within the decoder 18 power must be shut off and then reapplied. Then, only after a predetermined minimum time delay can processing of the generated codes resume, only to halt again upon the clocking of a 0 into the last stage of either shift register.

Overvoltage and Reserve Polarity Protection

The accessable leads from the lock circuitry in the present invention provide a potential means for overriding the electronic lock system. For example, in the power control circuit 26, an over-voltage or a reversal of voltage polarity may result in a spurious "true" state enabling operation of the SCRs in the hood lock and ignition circuits. To preclude such possibilities, a zener diode 182 is connected across the input to each primary voltage input line and a fuse 184 is in series with such line. When the input voltage applied to such a combination exceeds normal by some margin, the zener fires causing excessive current to flow, opening the series fuse. A reverse in voltage polarity will produce similar results except that the heavy current flow occurs when the forward diode voltage rather than the zener voltage is exceeded.

For low power circuits, only the zener diode 182 shunting the fused line is required. High-power circuits such as the ignition circuit 126 however, may employ a triac 186 to avoid excessively high power dissipation in the zener. As illustrated in FIG. 5 for the ignition circuit 126, the zener 182 is used to trigger the triac 186, the triac being shunted across the fused line with the its gate connected to the anode of the zener.

Having thus described an electronic locking system embodying the features of the present invention, it should be appreciated that the present invention provides a simple, fail-safe locking system which may be implemented in a standard auto ignition lock with a minimum of changes and expense. Further, while the invention has been described in conjunction with electro-mechanical transducer means for reading a key code and generating electrical signal and clock pulse information in response to movement of a key into a lock cylinder, other conventional transducers such as electro-optical sensors may be employed without departing from the spirit of the invention. Accordingly, it is intended that the present invention by limited in scope only by the terms of the following claims.

I claim:

1. A mechanical-electronic lock system for actuating auto ignitions and the like only upon sequential electronic and mechanical unlocking operations including a matching of a stored electronic lock code with an electronic key code generated as a key is being inserted into a lock cylinder followed by a mechanical turning of the key in the cylinder, the lock system comprising:

control means in a separate compartment and including storage means for storing a predetermined electrical lock code, comparator means for comparing said electrical lock code with electrical input codes to said control means, and means responsive only to a match between said lock and input codes for preconditioning an auto ignition and/or auto accessories for operating only in response to a subsequent mechanical turning of a lock cylinder in a mechanical key-actuated auto ignition lock:

a mechanical key-actuated auto ignition lock including a manually turnable lock cylinder for actuating said auto ignition and/or said auto accessories only after a preconditioning thereof by said control means followed by a turning of said lock cylinder, said cylinder having a keyway for receiving a mating ignition key for turning said lock cylinder in response to a turning of said mating ignition key;

a mating ignition key insertable into said keyway for turning said lock cylinder in response to a manual turning of said key and carrying a key code on a side face of said key, said key code matching said lock code;

transducer means in said auto ignition lock for reading said key code and generating an electrical key code indicative of said key code as said key is being inserted into said keyway; and means for applying said electrical key code to said control means as an electrical input code for comparison and matching with said electrical lock code to precondition said auto ignition and/or accessories.

2. The system of claim 1, further including input code lockout means in said control means for blocking input codes to said control means for predetermined periods of time in response to each electrical input code differing from said key code and generated by said transducer means or by means external to said system and applied to said control means.

3. The system of claim 2 further including an auxiliary electrical power circuit connected to said auto ignition lock and including an operator controlable switch for applying electric power only to said auto ignition and only in response to a combined operation of said lock and closing of said switch.

4. The system of claim 1 wherein:

said transducer means includes means for sensing said key code on said key and for generating a series of electrical pulses defining a binary coded key code indicative of said key code and clock pulse generating means responsive to movement of said key into said keyway for generating a series of clock pulses; and said control means includes a source of electric power, a shift register for serially receiving said series of electrical pulses defining said binary coded key code and for receiving said clock pulses to store said binary coded key code, programable circuit means for storing said electrical lock code as a binary coded lock code and for comparing said binary coded key code stored in said shift register and said binary coded lock code, gate means connected to said programable circuit means for transmiting electric power from said source to said accessories only upon a matching of said binary coded key and lock coded to precondition said accessories; and said input code lockout means includes means for blocking said clock pulses to said shift register for at least a predetermined minimum period of time after each storage of a binary coded signal in said shift register not indicative of said key code matching said binary coded lock code stored in said programable circuit means.

5. The system of claim 4 wherein the input of each of said means for generating said clock pulses, said shift register and said accessories includes an overvoltage protection device for preventing a voltage override of said system comprising a fuse means in series with said input and a Zener diode connected between said input and a reference ground.

6. The system of claim 4 wherein:

said key code is defined by a series of depressions spaced along a side of said key; and said transducer means includes a transfer pin slideable into a side opening in said lock cylinder for engaging said series of depressions as said key in inserted into said keyway, a spring for urging said transfer pin into said lock cylinder, and a switch connected to a source of electric power and to said control means for momentarily operating as said transfer pin moves axially into or out of a depression in said key to generate as electrical pulse.

7. The system of claim 6, wherein said clock pulse generating means comprises a stationary normally open switch connected to an electric power source and to said shift register, an actuating switch arm for closing said switch, and a spring loaded rod carrying a series of evenly spaced depressions supported for sliding movement adjacent an end of said lock cylinder in response to movement of said key into said keyway to cause said switch arm to ride over said depressions and produce a series of closings and openings of said switch to apply said series of clock pulses to said shift register.

8. The system of claim 1, wherein:
said key code is defined by a series of depressions spaced along a side of said key; and
said transducer means includes
- a transfer pin slideable into a side opening in said lock cylinder for engaging said series of depressions as said key is inserted into said keyway,
- a key pin slideable into a side opening in said lock cylinder opposite said transfer pin to ride in a keyway in a side of said key opposite said series of depressions,
- a pair of split ring members pivotally connected at one end to circumscribe said lock cylinder and engage exposed outer ends of said transfer and key pins, opposite ends of said split ring members carrying switch contacts defining a switch connected to an electric power source for momentarily operating as said transfer pin moves axially into or out of a depression in said key to generate an electrical pulse, and
springs means on outer surfaces of said split ring members for engaging an inner surface of a housing for said lock cylinder to urge said split ring members inwardly against said pins, whereby said key pin maintains separation of said other ends of said split ring members and contacts with lateral movement of said key in said keyway to prevent false closing of said switch.

* * * * *